(12) United States Patent
Liu

(10) Patent No.: US 12,532,208 B2
(45) Date of Patent: Jan. 20, 2026

(54) METHOD AND APPARATUS FOR CONFIGURING PRE-EMPTIVE BSR, AND ELECTRONIC DEVICE

(71) Applicant: VIVO MOBILE COMMUNICATION CO., LTD., Guangdong (CN)

(72) Inventor: Jinhua Liu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 352 days.

(21) Appl. No.: 18/301,451

(22) Filed: Apr. 17, 2023

(65) Prior Publication Data

US 2023/0262508 A1 Aug. 17, 2023

Related U.S. Application Data

(63) Continuation of application No. PCT/CN2021/124653, filed on Oct. 19, 2021.

(30) Foreign Application Priority Data

Oct. 19, 2020 (CN) .......................... 202011120095.2

(51) Int. Cl.
*H04W 24/10* (2009.01)
*H04W 28/02* (2009.01)

(52) U.S. Cl.
CPC ....... *H04W 24/10* (2013.01); *H04W 28/0278* (2013.01)

(58) Field of Classification Search
CPC ............. H04W 24/10; H04W 28/0278; H04W 84/047; H04W 28/0289; H04W 40/22; H04W 24/02; H04W 72/27; H04L 1/08
See application file for complete search history.

(56) References Cited

U.S. PATENT DOCUMENTS 10,075,871 B2  9/2018 Chen
2022/0272723 A1* 8/2022 Cho ...................... H04W 72/52

FOREIGN PATENT DOCUMENTS

| CN | 110536352 A | 12/2019 |
| CN | 111586751 A | 8/2020 |
| WO | 2019242603 A1 | 12/2019 |
| WO | 2020051588 A1 | 3/2020 |
| WO | 2020081729 A1 | 4/2020 |

(Continued)

OTHER PUBLICATIONS

3GPP TSG-RAN WG2 Meeting #106, "Triggering condition of Pre-BSR" (R2-1905829), May 13-17, 2019. (Year: 2019).*

(Continued)

*Primary Examiner* — Shawn D Miller
(74) *Attorney, Agent, or Firm* — Price Heneveld LLP

(57) ABSTRACT

A method and an apparatus for configuring a pre-emptive BSR, and an electronic device are provided. The method for configuring a pre-emptive BSR includes: receiving, by an integrated access backhaul IAB node, a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

20 Claims, 7 Drawing Sheets

(56) References Cited

FOREIGN PATENT DOCUMENTS

WO    2020087452 A1    5/2020

OTHER PUBLICATIONS

ITRI, Trigger Conditions for low-latency IAB Uplink Scheduling, 3GPP TSG-RAN WG2 Meeting #107bis, R2-1913065, Oct. 14-18, 2019, Chongqing, China.

ZTE Corporation, Sanechips, "Discussion on low latency scheduling in IAB", 3GPP TSG RAN WG2 Meeting #106, R2-1906571, May 13-17, 2019, Reno, Nevada, USA.

Futurewei, "Enhancements for low-latency IAB Uplink scheduling", 3GPP TSG-RAN WG2 meeting #107, R2-1911438, Aug. 26-30, 2019, Prague, Czech Republic.

Samsung (Rapporteur), "Report on email discussion [106#46][IAB]: Low-latency scheduling", 3GPP TSG-RAN WG2 #107-bis, R2-1912572 (resubmission of R2-1910028), Oct. 14-18, 2019, Chongqing, PRC.

Futurewei, "Enhancements for low-latency IAB Uplink scheduling", 3GPP TSG-RAN WG2 meeting #108, R2-1914768 (revision of R2-1913539), Nov. 18-22, 2019, Reno, Nevada.

Huawei, Hisilicon, "Remaining issues of the pre-emptive BSR", 3GPP TSG-RAN WG2 Meeting #109 electronic, R2-2000520, Feb. 24-Mar. 6, 2020.

Samsung (Rapporteur), IAB MAC impacts: Proposals for discussion and approval (Set III), 3GPP TSG-RAN WG2 #109-e, R2-2002217, Feb. 2020, E-meeting.

ZTE Corporation, Sanechips, "Discussion on low latency scheduling in IAB", 3GPP TSG-RAN WG2#107, R2-1909625, Aug. 26-30, 2019, Prague, Czech Republic.

* cited by examiner

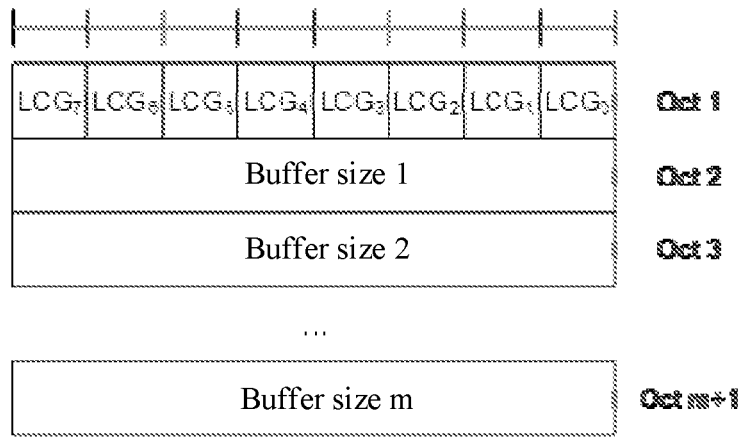

FIG. 5

| An integrated access backhaul IAB node receives a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node | ⟋ 101 |

FIG. 6

| A centralized unit CU transmits a pre-emptive BSR configuration parameter to an integrated access backhaul IAB node, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node | ⟋ 201 |

FIG. 7

METHOD AND APPARATUS FOR CONFIGURING PRE-EMPTIVE BSR, AND ELECTRONIC DEVICE

CROSS-REFERENCE TO RELATED APPLICATIONS

This application is continuation application of PCT International Application No. PCT/CN2021/124653 filed on Oct. 19, 2021, which claims priority to Chinese Patent Application No. 202011120095.2, filed on Oct. 19, 2020 in China, which are incorporated in their entireties by reference herein.

TECHNICAL FIELD

This application relates to the field of communication technologies, and in particular, to a method and an apparatus for configuring a pre-emptive BSR, and an electronic device.

BACKGROUND

According to current protocols, an integrated access backhaul (IAB) node is not allowed to trigger a pre-emptive BSR to a parent IAB node based on a pre-emptive BSR received. However, if a pre-emptive BSR cannot be triggered based on another pre-emptive BSR, when long backhaul links are used to serve low-latency services, multi hops in uplink wireless transmission lead to high latency, and therefore even if the pre-emptive BSR procedure is used, the latency in uplink transmission is significantly higher than the latency in downlink transmission.

SUMMARY

According to a first aspect, an embodiment of this application provides a method for configuring a pre-emptive BSR including:
receiving, by an integrated access backhaul IAB node, a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

According to a second aspect, an embodiment of this application provides a method for configuring a pre-emptive BSR including:
transmitting, by a centralized unit CU, a pre-emptive BSR configuration parameter to an integrated access backhaul IAB node, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

According to a third aspect, an embodiment of this application provides an apparatus for configuring a pre-emptive BSR, which is applied to an IAB node and includes:
a receiving module configured to receive a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

According to a fourth aspect, an embodiment of this application provides an apparatus for configuring a pre-emptive BSR, which is applied to a centralized unit and includes:
a transmitting module configured to transmit a pre-emptive BSR configuration parameter to an integrated access backhaul IAB node, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

According to a fifth aspect, an embodiment of this application further provides an electronic device including a processor, a memory, and a program or instructions stored in the memory and capable of running on the processor, where when the program or the instructions are executed by the processor, the steps of the foregoing method are implemented.

According to a sixth aspect, an embodiment of this application provides a readable storage medium, where the readable storage medium stores a program or instructions, and when the program or the instructions are executed by a processor, the steps of the foregoing method are implemented.

According to a seventh aspect, an embodiment of this application provides a chip, where the chip includes a processor and a communication interface, the communication interface is coupled to the processor, and the processor is configured to run a program or instructions to implement the method according to the first aspect or the second aspect.

According to an eighth aspect, a computer program product is provided, where the program product is stored in a non-volatile storage medium, and the program product is executed by at least one processor to implement the method according to the first aspect or the method according to the second aspect.

BRIEF DESCRIPTION OF DRAWINGS

FIG. 5 is a schematic diagram of a format of a pre-emptive BSR MAC CE;

FIG. 6 is a schematic flowchart of a method for configuring a pre-emptive BSR on an IAB node side according to an embodiment of this application;

FIG. 7 is a schematic flowchart of a method for configuring a pre-emptive BSR on a centralized unit side according to an embodiment of this application;

DESCRIPTION OF EMBODIMENTS

Figure 1:
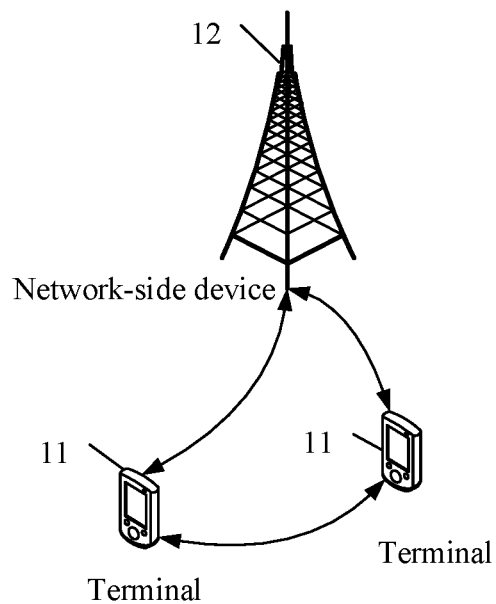
FIG. 1 is a schematic diagram of a wireless communication system.

The following clearly describes the technical solutions in embodiments of this application with reference to the accompanying drawings in the embodiments of this application. Apparently, the described embodiments are some but not all embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, in this specification and claims, "and/or" represents at least one of connected objects, and the character "/" generally represents an "or" relationship between associated objects.

The technologies described in this specification are not limited to long term evolution (LTE)/LTE-advanced (LTE-A) systems, and may also be used in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. A CDMA system may implement radio technologies such as CDMA2000 and universal terrestrial radio access (UTRA). UTRA includes wideband CDMA (Wideband Code Division Multiple Access, WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (for example, LTE-A) are new UMTS versions using E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used in the above-mentioned systems and radio technologies as well as other systems and radio technologies. In the following descriptions, an NR system is described for an illustration purpose, and NR terms are used in most of the following descriptions, although these technologies may also be applied to other applications than an NR system application.

The following descriptions provide examples without limiting the scope, applicability, or configuration set forth in the claims. The functions and arrangements of the elements under discussion may be changed without departing from the spirit and scope of the present disclosure. In the examples, various procedures or components may be appropriately omitted, replaced, or added. For example, the described method may be performed in an order different from that described, and steps may be added, omitted, or combined. In addition, features described with reference to some examples may be combined in other examples.

Refer to FIG. 1. FIG. 1 is a block diagram of a wireless communication system to which the embodiments of this application are applicable. The wireless communication system includes a terminal 11 and a network-side device 12. The terminal 11 may also be referred to as a terminal device or user terminal (UE). The terminal 11 may be a terminal-side device such as a mobile phone, a tablet personal computer, a laptop computer, a personal digital assistant (PDA), a mobile internet device (MID), a wearable device, or an in-vehicle device. It should be noted that the terminal 11 is not limited to a specific type in the embodiments of this application. The network-side device 12 may be a base station or a core network, where the base station may be a base station of 5G or a later version (for example, gNB or 5G NR NB), or a base station in other communication systems (for example, an eNB, a WLAN access point, or another access point), or a location server (for example, E-SMLC or LMF (Location Manager Function)). The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. Provided that the same technical effect is achieved, the base station is not limited to a specific technical term. It should be noted that the base station in the NR system is taken only as an example in the embodiments of this application, and the base station is not limited to a specific type and a specific communication system in the embodiments of this application.

Figure 2:
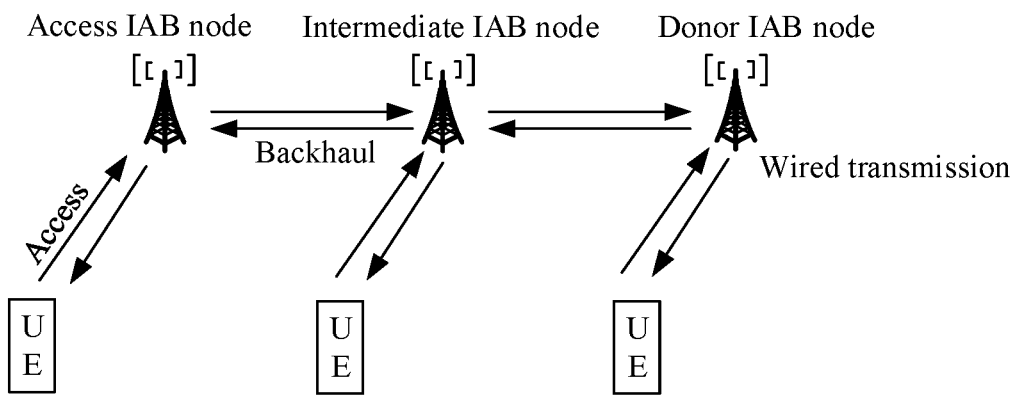
FIG. 2 is a schematic diagram of an IAB system.

FIG. 2 is a schematic diagram of an integrated access backhaul (IAB) system. An IAB node includes a distributed unit (DU) function and a mobile termination (MT) function. With an MT, an access point (that is, an IAB node) is able to find an upstream access point (parent IAB node) and establish a wireless connection to a DU of the upstream access point, and the wireless connection is referred to as a backhaul link. After the IAB node establishes a complete backhaul link, the IAB node enables its DU function. The DU provides a cell service, that is, the DU is capable of providing an access service for user equipment (UE). One integrated access backhaul loop includes one donor IAB node (or referred to as an IAB donor), and the donor IAB node has a directly connected wired transmission network.

Figure 3:
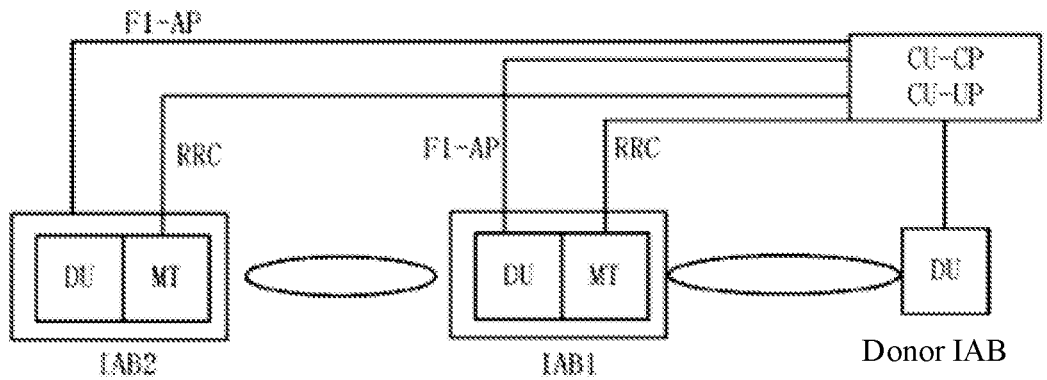
FIG. 3 is a diagram of a CU-DU structure of an IAB system.

FIG. 3 is a structural diagram of a CU-DU (Centralized Unit-Distributed Unit) of an IAB system. In one integrated access backhaul loop, DUs of all IAB nodes are connected to one centralized unit (CU) node, and this node makes configurations for the DUs according to an F1 protocol (F1 Application Protocol or F1 control protocol). The CU configures MTs according to a radio resource control (RRC) protocol. A donor IAB node has no MT function.

The IAB system is introduced to address no wired transmission network deployed in place in a case of dense deployment of access points. That is, when there is no wired transmission network, access points can rely on wireless backhaul.

Figure 4:
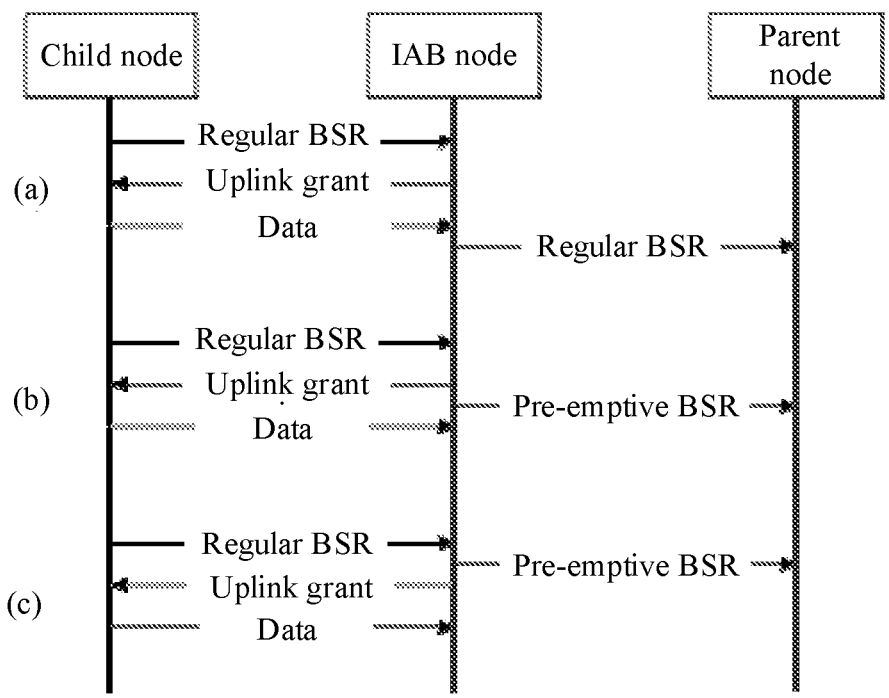
FIG. 4 is a schematic diagram of triggering a pre-emptive BSR based on an UL grant and a BSR.

To reduce latency in uplink data transmission, after receiving a buffer status report (BSR) from UE or a downstream node, an IAB node may trigger a pre-emptive BSR, or the IAB node may determine, based on an uplink grant (UL grant) from a downstream IAB node or UE, whether to trigger a pre-emptive BSR. FIG. 4 shows these two pre-emptive BSR triggering mechanisms. Such method for triggering a pre-emptive BSR based on data expected to be received enables an upstream node to perform scheduling in advance based on the data expected, so as to reduce the transmission latency.

At present, a pre-emptive BSR is transmitted in a same format as a long BSR media access control (MAC) control element (CE). The format of pre-emptive BSR MAC CE is shown in FIG. 5, where LCG (Logical Channel Group) is a logical channel group, and "buffer size" is a buffer size.

According to current protocols, an IAB node is not allowed to trigger a pre-emptive BSR to a parent IAB node based on a pre-emptive BSR received. However, if a pre-emptive BSR cannot be triggered based on another pre-emptive BSR, when long backhaul links are used to serve low-latency services, multi hops in uplink wireless transmission lead to high latency, and therefore even if the pre-emptive BSR procedure is used, the latency in uplink transmission is significantly higher than the latency in downlink transmission. In view of this, it is necessary to further study the method for triggering a pre-emptive BSR based on another pre-emptive BSR, so that the network can perform the optimized pre-emptive BSR procedure to meet quality requirements of low-latency services.

In addition, if an IAB node (IAB N1) is configured to trigger and transmit a pre-emptive BSR to a parent IAB node of the IAB node, and the parent IAB node (IAB N2) of the IAB node transmits an uplink grant to the IAB node based on the pre-emptive BSR received, IAB N2 may trigger a pre-emptive BSR to a higher-level parent IAB node (IAB N3) of IAB N2 based on such uplink grants. However, due to uncertainty of wireless link transmission, an amount of data actually received by IAB N2 may be quite different from an expected amount of data received. If the expected amount of data does not arrive, an uplink grant transmitted by IAB N3 to IAB N2 based on the pre-emptive BSR received is wasted. However, if IAB N2 does not trigger the pre-emptive BSR to IAB N3 according to the transmission grant, and IAB N2 receives data transmitted by IAB N1 according to the uplink grant, IAB N2 needs to trigger a conventional BSR procedure to request an uplink grant from IAB N3, leading to high transmission latency. Therefore, the problem of resource waste needs to be overcome to the greatest extent for the solution of triggering a pre-emptive BSR based on another pre-emptive BSR.

An embodiment of this application provides a method for configuring a pre-emptive buffer status report BSR. As shown in FIG. 6, the method includes the following steps.

Step 101: An integrated access backhaul IAB node receives a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

In this embodiment of this application, a centralized unit transmits a pre-emptive BSR configuration parameter to the IAB node so that the centralized unit and the IAB node can accurately control, based on an actual situation, whether a pre-emptive BSR can be triggered based on another pre-emptive BSR. This can alleviate the waste of uplink grants caused by pre-emptive BSRs while reducing transmission latency.

In this embodiment of this application, the CU may configure the access IAB node to determine whether and how an upstream IAB node further triggers a pre-emptive BSR based on a pre-emptive BSR received, including a new pre-emptive BSR MAC CE format. An upstream IAB node may determine whether to further trigger a pre-emptive BSR based on an indication in a pre-emptive BSR received and/or based on a preconfiguration by the CU. In this way, the CU and the IAB node can accurately control, based on a situation, whether a pre-emptive BSR can be triggered based on another pre-emptive BSR, alleviating the waste of uplink grants.

In this embodiment, a pre-emptive BSR capable of indicating a parent IAB node to generate an iterative pre-emptive BSR is referred to as an initial iterative pre-emptive BSR, and a pre-emptive BSR generated based on a pre-emptive BSR received is referred to as an iterative pre-emptive BSR.

In some embodiments, the configuration parameter includes at least one of the following:
  logical channel group LCG list for which triggering an iterative pre-emptive BSR is allowed, where in a specific example, UE1 is configured with LCG1 and LCG2, and the CU configures that the IAB node is allowed to trigger an iterative pre-emptive BSR based on LCG1 and not allowed to trigger an iterative pre-emptive BSR based on LCG2; if a BSR received by the IAB node from the UE indicates that LCG1 has data or that both LCG1 and LCG2 have data, it may be indicated in an initial iterative pre-emptive BSR transmitted to the parent IAB node that triggering an iterative pre-emptive BSR is allowed for LCG1; or, if a BSR received by the IAB node from the UE indicates that LCG1 has no data and LCG2 has data, it is not allowed to indicate triggering of an iterative pre-emptive BSR in an initial iterative pre-emptive BSR transmitted to the parent IAB node;
  logical channel LCH list for which triggering an iterative pre-emptive BSR is allowed;
  data radio bearer DRB list for which triggering an iterative pre-emptive BSR is allowed;
  service type list for which triggering an iterative pre-emptive BSR is allowed;
  user equipment UE type for which triggering an iterative pre-emptive BSR is allowed, where in a specific example, it may be configured that the access IAB node determines, based on a main service of UE, whether triggering an initial iterative pre-emptive BSR is allowed; for example, the CU may configure the access IAB node to trigger an initial iterative pre-emptive BSR based on a BSR from ultra-reliable and low latency communication (URLLC) UE; in another specific example, the CU may directly configure that the access IAB node is allowed to trigger an initial iterative pre-emptive BSR for specific UE; for example, it may be configured that the access IAB node triggers an initial iterative pre-emptive BSR based on a BSR from UE with high added value;
  number of iterations allowed to trigger an iterative pre-emptive BSR. The number of iterations may be configured based on LCG, LCH, DRB, service type or UE, and indicate the number of hops for which service data information can be pre-emptively transmitted; and
  time budget allowed for triggering an iterative pre-emptive BSR. The time budget may be configured based on LCG, LCH, DRB, service type or UE, and indicate an expected time within which buffered service data information can be iteratively transmitted to an upstream IAB node.

In this embodiment, the number of iterations and time budget allowed for triggering an iterative pre-emptive BSR are introduced to avoid unlimited transmission of iterative pre-emptive BSRs that makes a deviation between an actual amount of data for transmission and a data amount in an uplink buffer report become excessively large after multiple hops such that pre-emptive reporting becomes useless. Therefore, this avoids the waste of uplink grants. In addition, if iterative pre-emptive BSRs take too long, an uplink buffer status of an IAB node may change with generation of new service data, and a difference between a buffer status reported in a pre-emptive BSR and an actual buffer status becomes larger. In this case, it is meaningless to further trigger an iterative pre-emptive BSR based on a pre-emptive BSR.

In some embodiments, the configuration parameter further includes any one of the following:

first indication information used to indicate whether a subsequent intermediate node of the IAB node triggers an iterative pre-emptive BSR; and second indication information used to indicate that a subsequent intermediate node of the IAB node determines, based on a pre-emptive BSR received, whether to trigger an iterative pre-emptive BSR.

In some embodiments, if an uplink from the intermediate node to the parent IAB node is congested, an iterative pre-emptive BSR is not triggered; or if an uplink from the intermediate node to the parent IAB node is not congested, an iterative pre-emptive BSR is triggered.

Figure 8:
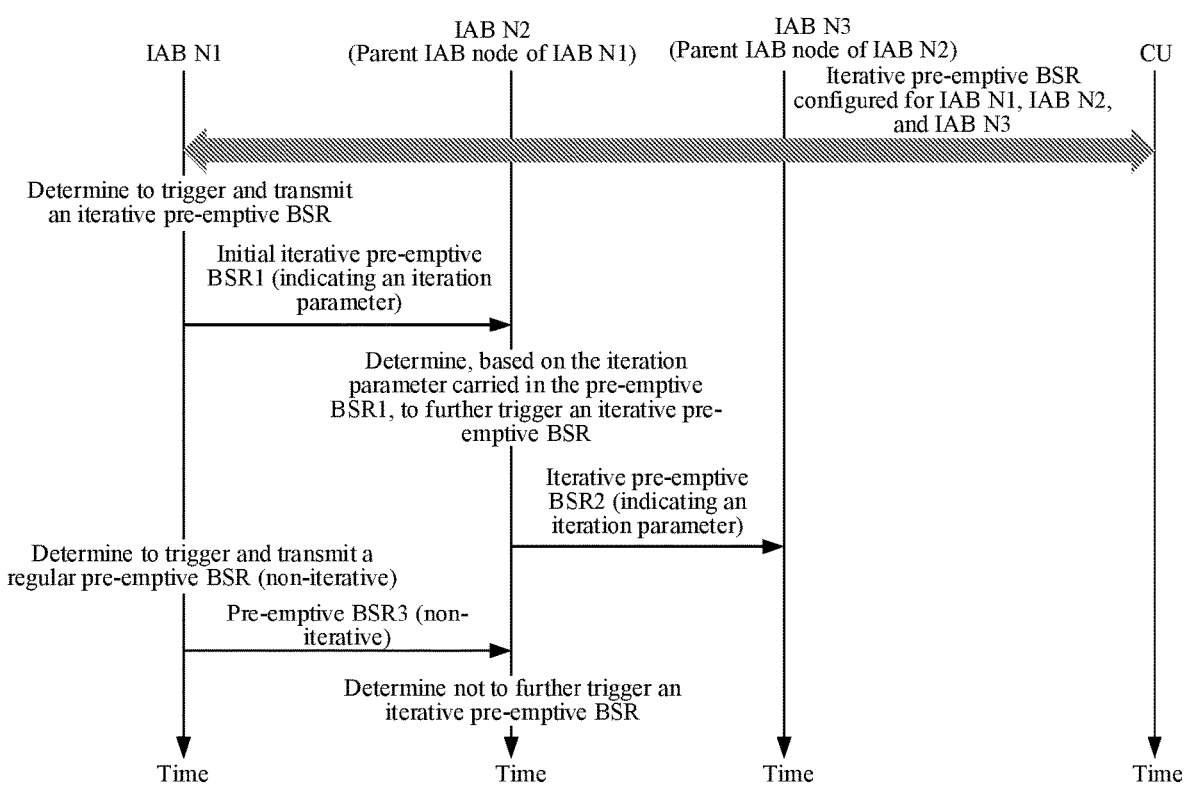
FIG. 8 is a schematic flowchart of an iterative pre-emptive BSR according to a specific embodiment of this application.

In a specific embodiment, the process of triggering an iterative pre-emptive BSR is shown in FIG. 8. If IAB N1, IAB N2, and IAB N3 are configured by the CU to trigger an iterative pre-emptive BSR, IAB N1 determines to trigger and transmit an iterative pre-emptive BSR, and IAB N1 transmits an initial iterative pre-emptive BSR1 (which carries and indicates an iteration parameter) to IAB N2; and IAB N2 determines, based on an iteration parameter carried in the pre-emptive BSR1, to further trigger an iterative pre-emptive BSR, and IAB N2 transmits an iterative pre-emptive BSR2 (which carries and indicates an iteration parameter) to IAB N3. If IAB N1 determines to trigger and transmit a regular pre-emptive BSR (that is, a non-iterative pre-emptive BSR), IAB N1 transmits a pre-emptive BSR3 (which indicates non-iterative) to IAB N2. After receiving the pre-emptive BSR3, IAB N2 determines not to further trigger an iterative pre-emptive BSR.

A subsequent intermediate node may be configured by the CU to determine, based on pre-emptive BSR information received, to trigger an iterative pre-emptive BSR. Alternatively, the subsequent intermediate node may be configured by the CU to determine, based on pre-emptive BSR information received, whether to trigger an iterative pre-emptive BSR. For example, if an uplink from an intermediate IAB node to a parent IAB node is congested, the intermediate IAB node may temporarily not trigger an iterative pre-emptive BSR, and wait until the uplink to the parent IAB node is no longer congested, and then normally trigger an iterative pre-emptive BSR. Congestion of the uplink may be determined based on an amount of uplink data for transmission exceeding a preset threshold.

In some embodiments, the configuration parameter may be carried in a BSR medium access control MAC control element CE.

In some embodiments, the BSR MAC CE includes one or more logical channel identity (LCD) values, and the one or more LCID values each indicate the number of iterations allowed for iterative pre-emptive BSR triggering.

In some embodiments, the method further includes:

after the pre-emptive BSR is triggered, selecting one LCID value from the one or more LCID values to indicate the number of iterations allowed for triggering an iterative pre-emptive BSR.

In this embodiment, an existing pre-emptive BSR MAC CE format may be used, as shown in FIG. 5. A new LCID is used to indicate an iterative pre-emptive BSR and the number of iterations. In a specific example, if it is predefined that one iteration can be performed at most, a new LCID is required to replace an original LCID. When an IAB node receives a pre-emptive BSR with the new LCID and further triggers a pre-emptive BSR based on the pre-emptive BSR, an existing pre-emptive BSR MAC CE format may be used. In another specific example, if it is predefined that two iterations can be performed at most, two new LCDs are required: LCID1 (corresponding to one iteration) and LCID2 (corresponding to two iterations). When receiving a pre-emptive BSR MAC CE carrying LCID2, the IAB node may determine to further trigger a pre-emptive BSR, and then generates a pre-emptive BSR MAC CE carrying LCID1. When receiving the pre-emptive BSR MAC CE carrying LCID1, the parent IAB node of the IAB node performs operations in the foregoing example. It should be noted that the LCID herein may be a conventional LCID (with 6 bits) or an eLCID (extended LCID, extended LCD, with 8 bits or 16 bits). This method does not require a new BSR MAC CE format.

In some embodiments, the BSR MAC CE includes a first bit map, and each bit in the first bit map corresponds to one LCG, indicating whether to trigger an iterative pre-emptive BSR based on a corresponding LCG.

Figure 9:
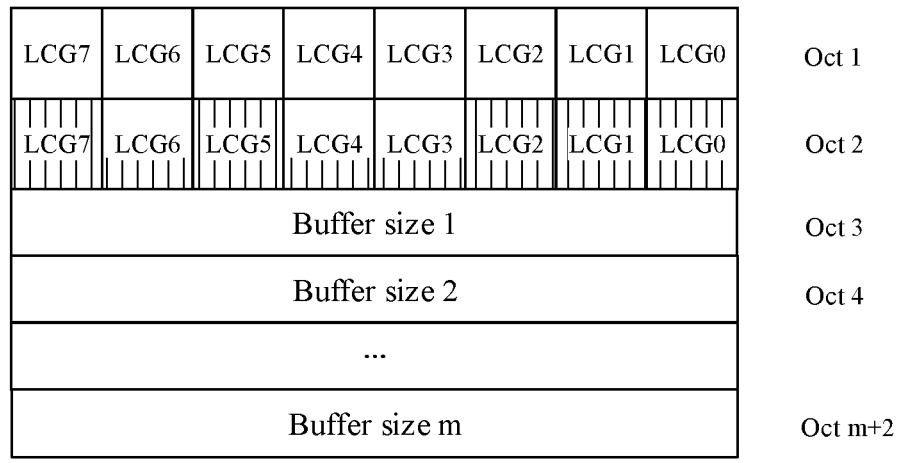
FIG. 9 is a schematic diagram of a format of a BSR MAC CE according to an embodiment of this application.

In this embodiment, a new pre-emptive BSR MAC CE format may be introduced, and a bitmap is added thereto. Each LCG corresponds to one bit, and this bit is used to indicate whether the parent IAB node is allowed to further trigger an iterative pre-emptive BSR for this LCG. The MAC CE format is shown in FIG. 9. A value of a bit LCGi (that is, a value of 1) in a shaded region indicates that triggering of an iterative pre-emptive BSR is allowed based on a buffer report for the LCG; or vice versa.

In some embodiments, the BSR MAC CE includes a first iteration count indication used to indicate the number of iterations allowed for triggering an iterative pre-emptive BSR for at least part of LCGs; or the BSR MAC CE includes a second iteration count indication used to indicate the number of iterations allowed for triggering an iterative pre-emptive BSR for at least one LCG.

In this embodiment, a new pre-emptive BSR MAC CE format may be introduced, referred to as an iterative pre-emptive BSR MAC CE, which carries an indication indicating whether triggering of an iterative pre-emptive BSR is allowed or the number of iterations for the iterative pre-emptive BSR. In a manner, the iterative pre-emptive BSR MAC CE carries one iteration number indication, which indicates the number of iterations for part or all of LCGs, for example, indicating only the number of iterations for an LCG with a highest priority. In another manner, the iterative pre-emptive BSR MAC CE carries multiple iteration number indications, and each number of iterations indicates the number of iterations for one or more LCGs. In a specific example, each LCG has an accompanying iteration count indication field, which indicates the number of iterations of pre-emptive BSR for the corresponding LCG. In another specific example, multiple LCGs share one accompanying iteration count indication field, which indicates the number of iterations of pre-emptive BSR for these LCGs.

In some embodiments, the method further includes:
if the IAB node generates, based on a first iterative pre-emptive BSR received, a second iterative pre-emptive BSR to be transmitted to the parent IAB node, decrementing a value of a first iteration count indication or a second iteration count indication in the first iterative pre-emptive BSR by 1, and adding the resulting value to the second iterative pre-emptive BSR.

In other words, a new pre-emptive BSR MAC CE format is used. If this pre-emptive BSR MAC CE format includes the number of iterations of iterative pre-emptive BSR, during generation of a new iterative pre-emptive BSR based on an iterative pre-emptive BSR received, an IAB node needs to subtract 1 from the number of iterations indicated by the iterative pre-emptive BSR received, and then adds the resulting value to the iterative pre-emptive BSR generated. When an iteration count indication field in the iterative pre-emptive BSR received is 0, it indicates that a new iterative pre-emptive BSR cannot be triggered or generated for an LCG corresponding to the iteration count indication field. In other words, if the iterative pre-emptive BSR received includes one or more iteration count indication fields, and at least one of the iteration count indication fields is greater than 0, an iterative pre-emptive BSR to be transmitted to the parent IAB node may be triggered or generated based on a buffer status of an LCG corresponding to the iteration count indication field being greater than 0. If all the iteration count indication fields are 0, an iterative pre-emptive BSR to be transmitted to the parent IAB node cannot be triggered or generated based on the iterative pre-emptive BSR.

In some embodiments, the BSR MAC CE includes a time budget indication used to indicate a time budget allowed for triggering an iterative pre-emptive BSR for at least one LCG.

In this embodiment, a new pre-emptive BSR MAC CE format may be introduced, referred to as an iterative pre-emptive BSR MAC CE, which carries an indication indicating an expected time budget allowed for triggering an iterative pre-emptive BSR. The time budget may be configured based on LCG. One or more or all LCGs may have one time budget indication. When a time budget indicated in an iterative pre-emptive BSR received by an IAB node is greater than a time budget required for a corresponding uplink transmission process scheduled for the IAB node, an iterative pre-emptive BSR can be further triggered; otherwise, an iterative pre-emptive BSR cannot be further triggered.

In some embodiments, the method further includes:
if the IAB node generates, based on a first iterative pre-emptive BSR received, a second iterative pre-emptive BSR to be transmitted to the parent IAB node, subtracting a time budget required for an uplink transmission process scheduled for a current hop from a value of a time budget indication in the first iterative pre-emptive BSR to obtain a remaining time budget, and using the remaining time budget as a value of a time budget indication in the second iterative pre-emptive BSR.

A new pre-emptive BSR MAC CE format is used. If the pre-emptive BSR MAC CE format includes a time budget allowed for triggering an iterative pre-emptive BSR, when an IAB node determines that an iterative pre-emptive BSR can be triggered, the IAB node needs to subtract a time budget required for an uplink transmission process scheduled for a current hop from a time budget indicated in an iterative pre-emptive BSR received to obtain a remaining time budget, adds the remaining time budget to an iterative pre-emptive BSR generated, and then transmits the new iterative pre-emptive BSR generated to the parent IAB node.

An embodiment of this application further provides a method for configuring a pre-emptive buffer status report BSR. As shown in FIG. 7, the method includes:
transmitting, by a centralized unit CU, a pre-emptive BSR configuration parameter to an integrated access backhaul IAB node, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

In this embodiment of this application, the CU may configure the access IAB node to determine whether and how an upstream IAB node further triggers a pre-emptive BSR based on a pre-emptive BSR received, including a new pre-emptive BSR MAC CE format. An upstream IAB node may determine whether to further trigger a pre-emptive BSR based on an indication in a pre-emptive BSR received and/or based on a preconfiguration by the CU. In this way, the CU and the IAB node can accurately control, based on a situation, whether a pre-emptive BSR can be triggered based on another pre-emptive BSR, alleviating the waste of uplink grants.

In some embodiments, the configuration parameter includes at least one of the following:
logical channel group LCG list for which triggering an iterative pre-emptive BSR is allowed, where in a specific example, UE1 is configured with LCG1 and LCG2, and the CU configures that the IAB node is allowed to trigger an iterative pre-emptive BSR based on LCG1 and not allowed to trigger an iterative pre-emptive BSR based on LCG2; if a BSR received by the IAB node from the UE indicates that LCG1 has data or that both LCG1 and LCG2 have data, it may be indicated in an initial iterative pre-emptive BSR transmitted to the parent IAB node that triggering an iterative pre-emptive BSR is allowed for LCG1; or, if a BSR received by the IAB node from the UE indicates that LCG1 has no data and LCG2 has data, it is not allowed to indicate triggering of an iterative pre-emptive BSR in an initial iterative pre-emptive BSR transmitted to the parent IAB node;
logical channel LCH list for which triggering an iterative pre-emptive BSR is allowed;
data radio bearer DRB list for which triggering an iterative pre-emptive BSR is allowed;
service type list for which triggering an iterative pre-emptive BSR is allowed;
user equipment UE type for which triggering an iterative pre-emptive BSR is allowed, where in a specific example, it may be configured that the access IAB node determines, based on a main service of UE, whether triggering an initial iterative pre-emptive BSR is allowed, for example, the CU may configure the access IAB node to trigger an initial iterative pre-emptive BSR based on a BSR from ultra-reliable and low latency communication (URLLC) UE; in another specific example, the CU may directly configure that the access IAB node is allowed to trigger an initial iterative pre-emptive BSR for specific UE, for example, it may be configured that the access IAB node triggers an initial iterative pre-emptive BSR based on a BSR from UE with high added value;

number of iterations allowed to trigger an iterative pre-emptive BSR. The number of iterations may be configured based on LCG, LCH, DRB, service type or UE, and indicate the number of hops for which service data information can be pre-emptively transmitted; and time budget allowed for triggering an iterative pre-emptive BSR. The time budget may be configured based on LCG, LCH, DRB, service type or UE, and indicate an expected time within which buffered service data information can be iteratively transmitted to an upstream IAB node.

In this embodiment, the number of iterations and time budget allowed for triggering an iterative pre-emptive BSR are introduced to avoid unlimited transmission of iterative pre-emptive BSRs that makes a deviation between an actual amount of data for transmission and a data amount in an uplink buffer report become excessively large after multiple hops such that pre-emptive reporting becomes useless. Therefore, this avoids the waste of uplink grants. In addition, if iterative pre-emptive BSRs take too long, an uplink buffer status of an IAB node may change with generation of new service data, and a difference between a buffer status reported in a pre-emptive BSR and an actual buffer status becomes larger. In this case, it is meaningless to further trigger an iterative pre-emptive BSR based on a pre-emptive BSR.

In some embodiments, the configuration parameter further includes any one of the following:

first indication information used to indicate whether a subsequent intermediate node of the IAB node triggers an iterative pre-emptive BSR; and second indication information used to indicate that a subsequent intermediate node of the IAB node determines, based on a pre-emptive BSR received, whether to trigger an iterative pre-emptive BSR.

In some embodiments, if an uplink from the intermediate node to the parent IAB node is congested, an iterative pre-emptive BSR is not triggered; or if an uplink from the intermediate node to the parent IAB node is not congested, an iterative pre-emptive BSR is triggered.

In a specific embodiment, the process of triggering an iterative pre-emptive BSR is shown in FIG. 8. If IAB N1, IAB N2, and IAB N3 are configured by the CU to trigger an iterative pre-emptive BSR, IAB N1 determines to trigger and transmit an iterative pre-emptive BSR, and IAB N1 transmits an initial iterative pre-emptive BSR1 (which carries and indicates an iteration parameter) to IAB N2; and IAB N2 determines, based on an iteration parameter carried in the pre-emptive BSR1, to further trigger an iterative pre-emptive BSR, and IAB N2 transmits an iterative pre-emptive BSR2 (which carries and indicates an iteration parameter) to IAB N3. If IAB N1 determines to trigger and transmit a regular pre-emptive BSR (that is, a non-iterative pre-emptive BSR), IAB N1 transmits a pre-emptive BSR3 (which indicates non-iterative) to IAB N2. After receiving the pre-emptive BSR3, IAB N2 determines not to further trigger an iterative pre-emptive BSR.

A subsequent intermediate node may be configured by the CU to determine, based on pre-emptive BSR information received, to trigger an iterative pre-emptive BSR. Alternatively, the subsequent intermediate node may be configured by the CU to determine, based on pre-emptive BSR information received, whether to trigger an iterative pre-emptive BSR. For example, if an uplink from an intermediate IAB node to a parent IAB node is congested, the intermediate IAB node may temporarily not trigger an iterative pre-emptive BSR, and wait until the uplink to the parent IAB node is no longer congested, and then normally trigger an iterative pre-emptive BSR. Congestion of the uplink may be determined based on an amount of uplink data for transmission exceeding a preset threshold.

In some embodiments, the configuration parameter is carried in a BSR medium access control MAC control element CE.

In some embodiments, the configuration parameter may be carried in a BSR medium access control MAC control element CE.

In some embodiments, the BSR MAC CE includes one or more logical channel identity (LCD) values, and the one or more LCID values each indicate the number of iterations allowed for iterative pre-emptive BSR triggering.

In some embodiments, the method further includes:

after the pre-emptive BSR is triggered, selecting one LCID value from the one or more LCID values to indicate the number of iterations allowed for triggering an iterative pre-emptive BSR.

In this embodiment, an existing pre-emptive BSR MAC CE format may be used, as shown in FIG. 5. A new LCID is used to indicate an iterative pre-emptive BSR and the number of iterations. In a specific example, if it is predefined that one iteration can be performed at most, a new LCID is required to replace an original LCID. When an IAB node receives a pre-emptive BSR with the new LCID and further triggers a pre-emptive BSR based on the pre-emptive BSR, an existing pre-emptive BSR MAC CE format may be used. In another specific example, if it is predefined that two iterations can be performed at most, two new LCDs are required: LCID1 (corresponding to one iteration) and LCID2 (corresponding to two iterations). When receiving a pre-emptive BSR MAC CE carrying LCID2, the IAB node may determine to further trigger a pre-emptive BSR, and then generates a pre-emptive BSR MAC CE carrying LCID1. When receiving the pre-emptive BSR MAC CE carrying LCID1, the parent IAB node of the IAB node performs operations in the foregoing example. It should be noted that the LCID herein may be a conventional LCID (with 6 bits) or an eLCID (extended LCID, extended LCD, with 8 bits or 16 bits). This method does not require a new BSR MAC CE format.

In some embodiments, the BSR MAC CE includes a first bit map, and each bit in the first bit map corresponds to one LCG, indicating whether to trigger an iterative pre-emptive BSR based on a corresponding LCG.

In this embodiment, a new pre-emptive BSR MAC CE format may be introduced, and a bitmap is added thereto. Each LCG corresponds to one bit, and this bit is used to indicate whether the parent IAB node is allowed to further trigger an iterative pre-emptive BSR for this LCG. The MAC CE format is shown in FIG. 9. A value of a bit LCGi (that is, a value of 1) in a shaded region indicates that triggering of an iterative pre-emptive BSR is allowed based on a buffer report for the LCG; or vice versa.

In some embodiments, the BSR MAC CE includes a first iteration count indication used to indicate the number of iterations allowed for triggering an iterative pre-emptive BSR for at least part of LCGs; or the BSR MAC CE includes a second iteration count indication used to indicate the number of iterations allowed for triggering an iterative pre-emptive BSR for at least one LCG.

In this embodiment, a new pre-emptive BSR MAC CE format may be introduced, referred to as an iterative pre-emptive BSR MAC CE, which carries an indication indicating whether triggering of an iterative pre-emptive BSR is allowed or the number of iterations for the iterative pre-emptive BSR. In a manner, the iterative pre-emptive BSR MAC CE carries one iteration number indication, which indicates the number of iterations for part or all of LCGs, for example, indicating only the number of iterations for an LCG with a highest priority. In another manner, the iterative pre-emptive BSR MAC CE carries multiple iteration number indications, and each number of iterations indicates the number of iterations for one or more LCGs. In a specific example, each LCG has an accompanying iteration count indication field, which indicates the number of iterations of pre-emptive BSR for the corresponding LCG. In another specific example, multiple LCGs share one accompanying iteration count indication field, which indicates the number of iterations of pre-emptive BSR for these LCGs.

In some embodiments, the BSR MAC CE includes a time budget indication used to indicate a time budget allowed for triggering an iterative pre-emptive BSR for at least one LCG.

In this embodiment, a new pre-emptive BSR MAC CE format may be introduced, referred to as an iterative pre-emptive BSR MAC CE, which carries an indication indicating an expected time budget allowed for triggering an iterative pre-emptive BSR. The time budget may be configured based on LCG. One or more or all LCGs may have one time budget indication. When a time budget indicated in an iterative pre-emptive BSR received by an IAB node is greater than a time budget required for a corresponding uplink transmission process scheduled for the IAB node, an iterative pre-emptive BSR can be further triggered; otherwise, an iterative pre-emptive BSR cannot be further triggered.

It should be noted that the method for configuring a pre-emptive BSR provided in the embodiments of this application may be performed by an apparatus for configuring a pre-emptive BSR or a module for loading and performing the method for configuring a pre-emptive BSR in the apparatus for configuring a pre-emptive BSR. In the embodiments of this application, the apparatus for configuring a pre-emptive BSR loading and performing the method for configuring a pre-emptive BSR is used as an example to describe the method for configuring a pre-emptive BSR provided in the embodiments of this application.

Figure 10:
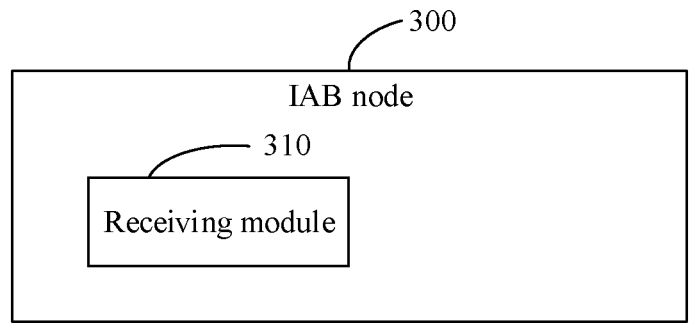
FIG. 10 is a schematic structural diagram of an apparatus for configuring a pre-emptive BSR on an IAB node side according to an embodiment of this application.

An embodiment of this application provides an apparatus for configuring a pre-emptive BSR, which is applied to an IAB node 300. As shown in FIG. 10, the apparatus includes:
- a receiving module 310 configured to receive a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

In some embodiments, the configuration parameter includes at least one of the following:
- logical channel group LCG list for which triggering an iterative pre-emptive BSR is allowed;
- logical channel LCH list for which triggering an iterative pre-emptive BSR is allowed;
- data radio bearer DRB list for which triggering an iterative pre-emptive BSR is allowed;
- service type list for which triggering an iterative pre-emptive BSR is allowed;
- user equipment UE type for which triggering an iterative pre-emptive BSR allowed;
- number of iterations allowed for triggering an iterative pre-emptive BSR; and
- time budget allowed for triggering an iterative pre-emptive BSR.

In some embodiments, the configuration parameter further includes any one of the following:
- first indication information used to indicate whether a subsequent intermediate node of the IAB node triggers an iterative pre-emptive BSR; and
- second indication information used to indicate that a subsequent intermediate node of the IAB node determines, based on a pre-emptive BSR received, whether to trigger an iterative pre-emptive BSR.

In some embodiments, if an uplink from the intermediate node to the parent IAB node is congested, an iterative pre-emptive BSR is not triggered; or if an uplink from the intermediate node to the parent IAB node is not congested, an iterative pre-emptive BSR is triggered.

In some embodiments, the configuration parameter is carried in a BSR medium access control MAC control element CE.

In some embodiments, the BSR MAC CE includes one or more logical channel identity LCID values, and the one or more LCID values each indicate the number of iterations allowed for triggering an iterative pre-emptive BSR.

In some embodiments, the apparatus further includes:
- a processing module configured to: after the pre-emptive BSR is triggered, select one LCID value from the one or more LCID values to indicate the number of iterations allowed for triggering an iterative pre-emptive BSR.

In some embodiments, the BSR MAC CE includes a first bit map, and each bit in the first bit map corresponds to one LCG, indicating whether to trigger an iterative pre-emptive BSR based on a corresponding LCG.

In some embodiments, the BSR MAC CE includes a first iteration count indication used to indicate the number of iterations allowed for triggering an iterative pre-emptive BSR for at least part of LCGs; or
the BSR MAC CE includes a second iteration count indication used to indicate the number of iterations allowed for triggering an iterative pre-emptive BSR for at least one LCG.

In some embodiments, the apparatus further includes:
- a first generating module configured to: if the IAB node generates, based on a first iterative pre-emptive BSR received, a second iterative pre-emptive BSR to be transmitted to the parent IAB node, decrement a value of a first iteration count indication or a second iteration count indication in the first iterative pre-emptive BSR by 1, and add the resulting value to the second iterative pre-emptive BSR.

In some embodiments, the BSR MAC CE includes a time budget indication used to indicate a time budget allowed for triggering an iterative pre-emptive BSR for at least one LCG.

In some embodiments, the apparatus further includes:
- a second generating module configured to: if the IAB node generates, based on a first iterative pre-emptive BSR received, a second iterative pre-emptive BSR to be transmitted to the parent IAB node, subtract a time budget required for an uplink transmission process scheduled for a current hop from a value of a time budget indication in the first iterative pre-emptive BSR to obtain a remaining time budget, and use the remaining time budget as a value of a time budget indication in the second iterative pre-emptive BSR.

The apparatus for configuring a pre-emptive BSR in this embodiment of this application may be an apparatus or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, or a personal digital assistant (PDA), or the like. The non-mobile electronic device may be a network attached storage (NAS), a personal computer (PC), a television (TV), a teller machine, a self-service machine, or the like. This is not specifically limited in the embodiments of this application.

The apparatus for configuring a pre-emptive BSR in this embodiment of this application may be an apparatus with an operating system. The operating system may be an android (Android) operating system, may be an iOS operating system, or may be another possible operating system. This is not specifically limited in the embodiments of this application.

It should be noted that the method for configuring a pre-emptive BSR provided in the embodiments of this application may be performed by an apparatus for configuring a pre-emptive BSR or a module for loading and performing the method for configuring a pre-emptive BSR in the apparatus for configuring a pre-emptive BSR. In the embodiments of this application, the apparatus for configuring a pre-emptive BSR loading and performing the method for configuring a pre-emptive BSR is used as an example to describe the method for configuring a pre-emptive BSR provided in the embodiments of this application.

Figure 11:
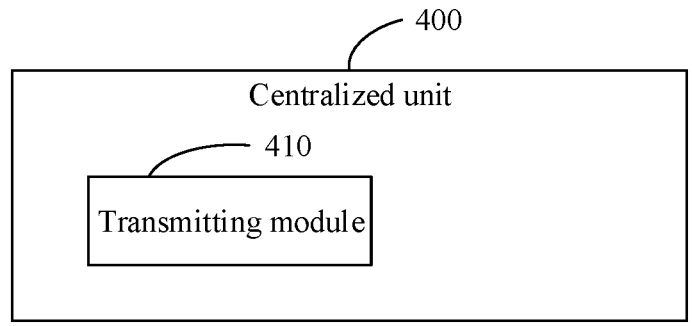
FIG. 11 is a schematic structural diagram of an apparatus for configuring a pre-emptive BSR on a centralized unit side according to an embodiment of this application.

An embodiment of this application provides an apparatus for configuring a pre-emptive BSR, which is applied to a centralized unit 400. As shown in FIG. 11, the apparatus includes:

a transmitting module 410 configured to transmit a pre-emptive BSR configuration parameter to an integrated access backhaul IAB node, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

In some embodiments, the configuration parameter includes at least one of the following:

logical channel group LCG list for which triggering an iterative pre-emptive BSR is allowed;

logical channel LCH list for which triggering an iterative pre-emptive BSR is allowed;

data radio bearer DRB list for which triggering an iterative pre-emptive BSR is allowed;

service type list for which triggering an iterative pre-emptive BSR is allowed;

user equipment UE type for which triggering an iterative pre-emptive BSR is allowed;

number of iterations allowed for triggering an iterative pre-emptive BSR; and time budget allowed for triggering an iterative pre-emptive BSR.

In some embodiments, the configuration parameter further includes any one of the following:

first indication information used to indicate whether a subsequent intermediate node of the IAB node triggers an iterative pre-emptive BSR; and second indication information used to indicate that a subsequent intermediate node of the IAB node determines, based on a pre-emptive BSR received, whether to trigger an iterative pre-emptive BSR.

In some embodiments, if an uplink from the intermediate node to the parent IAB node is congested, an iterative pre-emptive BSR is not triggered; or if an uplink from the intermediate node to the parent IAB node is not congested, an iterative pre-emptive BSR is triggered.

In some embodiments, the configuration parameter is carried in a BSR medium access control MAC control element CE.

In some embodiments, the BSR MAC CE includes one or more logical channel identity LCID values, and the one or more LCID values each indicate the number of iterations allowed for triggering an iterative pre-emptive BSR.

In some embodiments, the apparatus further includes:

a processing module configured to: after the pre-emptive BSR is triggered, select one LCID value from the one or more LCID values to indicate the number of iterations allowed for triggering an iterative pre-emptive BSR.

In some embodiments, the BSR MAC CE includes a first bit map, and each bit in the first bit map corresponds to one LCG, indicating whether to trigger an iterative pre-emptive BSR based on a corresponding LCG.

In some embodiments, the BSR MAC CE includes a first iteration count indication used to indicate the number of iterations allowed for triggering an iterative pre-emptive BSR for at least part of LCGs; or the BSR MAC CE includes a second iteration count indication used to indicate the number of iterations allowed for triggering an iterative pre-emptive BSR for at least one LCG.

In some embodiments, the BSR MAC CE includes a time budget indication used to indicate a time budget allowed for triggering an iterative pre-emptive BSR for at least one LCG.

The apparatus for configuring a pre-emptive BSR in this embodiment of this application may be an apparatus with an operating system. The operating system may be an android (Android) operating system, may be an iOS operating system, or may be another possible operating system. This is not specifically limited in the embodiments of this application.

Optionally, an embodiment of this application further provides an electronic device, including a processor, a memory, and a program or instructions stored in the memory and capable of running on the processor. When the program or the instructions are executed by the processor, the processes of the embodiments of the foregoing method for configuring a pre-emptive BSR are implemented, with the same technical effects achieved. To avoid repetition, details are not described herein again.

It should be noted that the electronic device in this embodiment of this application includes the foregoing mobile electronic device and non-mobile electronic device.

Figure 12:
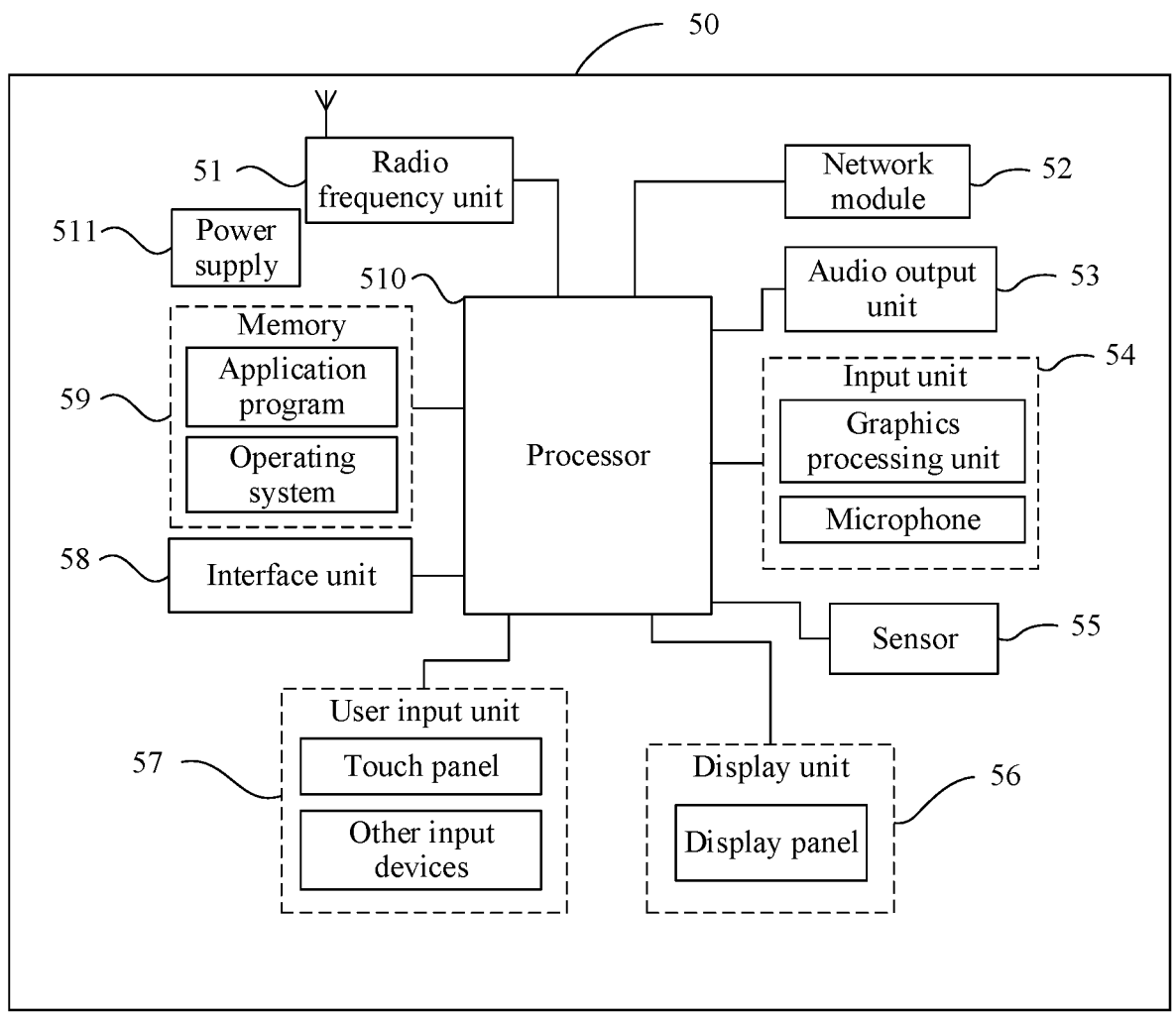
FIG. 12 is a schematic diagram of composition of a terminal according to an embodiment of this application.

The electronic device in this embodiment may be a terminal. FIG. 12 is a schematic diagram of a hardware structure of a terminal for implementing the embodiments of this application. The terminal 50 includes but is not limited to components such as a radio frequency unit 51, a network module 52, an audio output unit 53, an input unit 54, a sensor 55, a display unit 56, a user input unit 57, an interface unit 58, a memory 59, a processor 510, and a power supply 511. Those skilled in the art may understand that the terminal structure shown in FIG. 12 does not constitute a limitation to the terminal. The terminal may include more or fewer components than shown in the figure, or combine some components, or have different component arrangements. In this embodiment of this application, the terminal includes but is not limited to a mobile phone, a tablet computer, a laptop computer, a palmtop computer, a vehicle-mounted mobile terminal, a wearable device, and a pedometer.

It should be understood that in this embodiment of this application, the radio frequency unit 51 may be configured to receive and send information, or to receive and send a signal in a call process, and specially, after receiving downlink data from a base station, send the downlink data to the processor 510 for processing; and also send uplink data to the base station. Generally, the radio frequency unit 51 includes but is not limited to an antenna, at least one amplifier, a transceiver, a coupler, a low noise amplifier, and a duplexer. In addition, the radio frequency unit 51 may further communicate with another device by using a wireless communications system and network.

The memory 59 may be configured to store software programs and various data. The memory 59 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 59 may include a high-speed random access memory, and may further include a non-volatile memory, for example, at least one magnetic disk storage device, a flash storage device, or another volatile solid-state storage device.

The processor 510 is a control center of the terminal, and is connected to all parts of the entire terminal via various interfaces and lines. By running or executing a software program and/or a module that is stored in the memory 59 and invoking data stored in the memory 59, the processor 510 performs various functions of the terminal and data processing, so as to perform overall monitoring on the terminal. The processor 510 may include one or at least two processing units. Preferably, the processor 510 may integrate an application processor and a modem processor. The application processor mainly processes an operating system, a user interface, an application program, and the like. The modem processor mainly processes wireless communication. It can be understood that the modem processor may alternatively be not integrated in the processor 510.

The terminal 50 may further include the power supply 511 (for example, a battery) that supplies power to various components. Preferably, the power supply 511 may be logically connected to the processor 510 through a power supply management system, so that functions such as charging and discharging management and power consumption management are implemented by using the power management system.

In addition, the terminal 50 includes some function modules that are not shown. Details are not described herein.

In some embodiments, the processor 510 is configured to receive a pre-emptive BSR configuration parameter, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

In some embodiments, the configuration parameter includes at least one of the following:
 logical channel group LCG list for which triggering an iterative pre-emptive BSR is allowed;
 logical channel LCH list for which triggering an iterative pre-emptive BSR is allowed;
 data radio bearer DRB list for which triggering an iterative pre-emptive BSR is allowed;
 service type list for which triggering an iterative pre-emptive BSR is allowed;
 user equipment UE type for which triggering an iterative pre-emptive BSR is allowed;
 number of iterations allowed for triggering an iterative pre-emptive BSR; and
 time budget allowed for triggering an iterative pre-emptive BSR.

In some embodiments, the configuration parameter further includes any one of the following:
 first indication information used to indicate whether a subsequent intermediate node of the IAB node triggers an iterative pre-emptive BSR; and
 second indication information used to indicate that a subsequent intermediate node of the IAB node determines, based on a pre-emptive BSR received, whether to trigger an iterative pre-emptive BSR.

In some embodiments, if an uplink from the intermediate node to the parent IAB node is congested, an iterative pre-emptive BSR is not triggered; or if an uplink from the intermediate node to the parent IAB node is not congested, an iterative pre-emptive BSR is triggered.

In some embodiments, the configuration parameter is carried in a BSR medium access control MAC control element CE.

In some embodiments, the BSR MAC CE includes one or more logical channel identity LCID values, and the one or more LCID values each indicate the number of iterations allowed for triggering an iterative pre-emptive BSR.

In some embodiments, the processor 510 is configured to: after the pre-emptive BSR is triggered, select one LCID value from the one or more LCID values to indicate the number of iterations allowed for triggering an iterative pre-emptive BSR.

In some embodiments, the BSR MAC CE includes a first bit map, and each bit in the first bit map corresponds to one LCG, indicating whether to trigger an iterative pre-emptive BSR based on a corresponding LCG.

In some embodiments, the BSR MAC CE includes a first iteration count indication used to indicate the number of iterations allowed for triggering an iterative pre-emptive BSR for at least part of LCGs; or
 the BSR MAC CE includes a second iteration count indication used to indicate the number of iterations allowed for triggering an iterative pre-emptive BSR for at least one LCG.

In some embodiments, the processor 510 is configured to: if the IAB node generates, based on a first iterative pre-emptive BSR received, a second iterative pre-emptive BSR to be transmitted to the parent IAB node, decrement a value of a first iteration count indication or a second iteration count indication in the first iterative pre-emptive BSR by 1, and add the resulting value to the second iterative pre-emptive BSR.

In some embodiments, the BSR MAC CE includes a time budget indication used to indicate a time budget allowed for triggering an iterative pre-emptive BSR for at least one LCG.

In some embodiments, the processor 510 is configured to: if the IAB node generates, based on a first iterative pre-emptive BSR received, a second iterative pre-emptive BSR to be transmitted to the parent IAB node, subtract a time budget required for an uplink transmission process scheduled for a current hop from a value of a time budget indication in the first iterative pre-emptive BSR to obtain a remaining time budget, and use the remaining time budget as a value of a time budget indication in the second iterative pre-emptive BSR.

Figure 13:
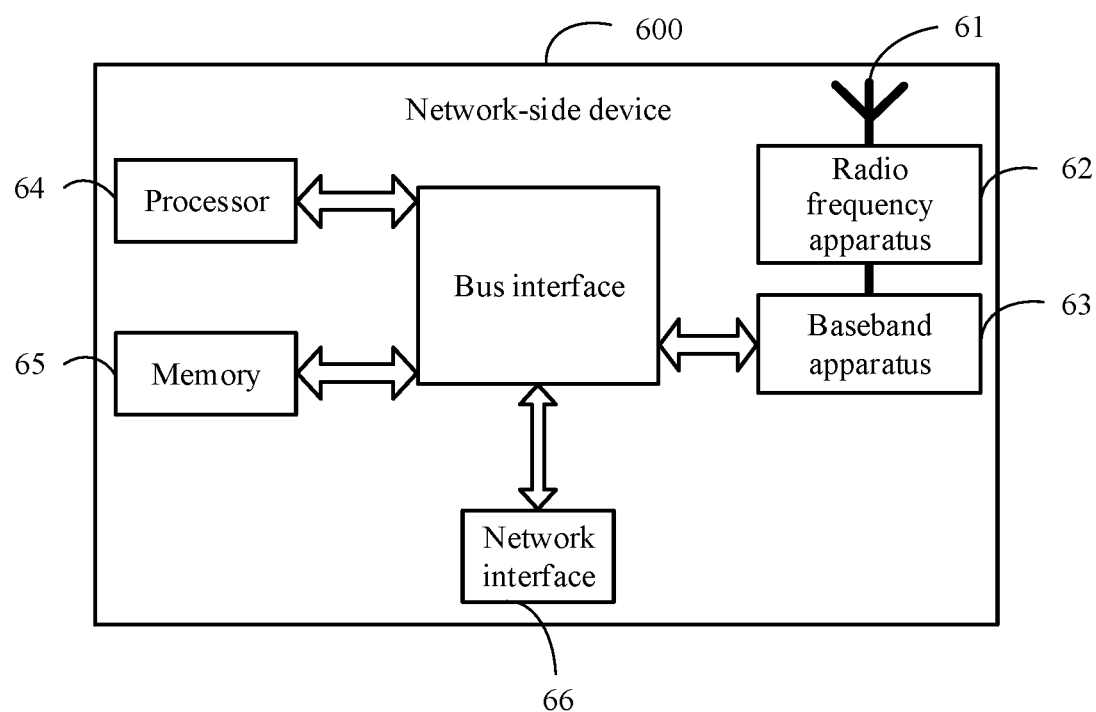
FIG. 13 is a schematic diagram of composition of a network-side device according to an embodiment of this application.

The electronic device in this embodiment may alternatively be a network-side device. As shown in FIG. 13, the network-side device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the information to the radio frequency apparatus 62; and the radio frequency apparatus 62 processes the received information and then sends the information by using the antenna 61.

The frequency band processing apparatus may be located in the baseband apparatus 63. The method performed by the network-side device in the foregoing embodiment may be implemented in the baseband apparatus 63, and the baseband apparatus 63 includes a processor 64 and a memory 65.

The baseband apparatus 63 may include, for example, at least one baseband processing unit, where a plurality of chips are disposed on the baseband processing unit. As shown in FIG. 13, one of the chips is, for example, the processor 64, and connected to the memory 65, to invoke the program in the memory 65 to perform the operations of the network-side device shown in the foregoing method embodiments.

The baseband apparatus 63 may further include a network interface 66, configured to exchange information with the radio frequency apparatus 62, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network-side device, for example, one or more microprocessors DSP, or one or more field programmable gate arrays FPGA. A storage component may be a memory, or may be a collective term for a plurality of storage components.

The memory 65 may be a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synch link dynamic random access memory (Synch Link DRAM, SLDRAM), and a direct rambus random access memory (Direct Rambus RAM, DRRAM). The memory 65 described in this application is intended to include but is not limited to these and any other suitable types of memories.

In some embodiments, the processor 64 is configured to transmit a pre-emptive BSR configuration parameter to an integrated access backhaul IAB node, where the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

In some embodiments, the configuration parameter includes at least one of the following:
  logical channel group LCG list for which triggering an iterative pre-emptive BSR is allowed;
  logical channel LCH list for which triggering an iterative pre-emptive BSR is allowed;
  data radio bearer DRB list for which triggering an iterative pre-emptive BSR is allowed;
  service type list for which triggering an iterative pre-emptive BSR is allowed;
  user equipment UE type for which triggering an iterative pre-emptive BSR is allowed;
  number of iterations allowed for triggering an iterative pre-emptive BSR; and
  time budget allowed for triggering an iterative pre-emptive BSR.

In some embodiments, the configuration parameter further includes any one of the following:
  first indication information used to indicate whether a subsequent intermediate node of the IAB node triggers an iterative pre-emptive BSR; and
  second indication information used to indicate that a subsequent intermediate node of the IAB node determines, based on a pre-emptive BSR received, whether to trigger an iterative pre-emptive BSR.

In some embodiments, if an uplink from the intermediate node to the parent IAB node is congested, an iterative pre-emptive BSR is not triggered; or if an uplink from the intermediate node to the parent IAB node is not congested, an iterative pre-emptive BSR is triggered.

In some embodiments, the configuration parameter is carried in a BSR medium access control MAC control element CE.

In some embodiments, the BSR MAC CE includes one or more logical channel identity LCID values, and the one or more LCID values each indicate the number of iterations allowed for triggering an iterative pre-emptive BSR.

In some embodiments, the processor 64 is configured to: after the pre-emptive BSR is triggered, select one LCID value from the one or more LCID values to indicate the number of iterations allowed for triggering an iterative pre-emptive BSR.

In some embodiments, the BSR MAC CE includes a first bit map, and each bit in the first bit map corresponds to one LCG, indicating whether to trigger an iterative pre-emptive BSR based on a corresponding LCG.

In some embodiments, the BSR MAC CE includes a first iteration count indication used to indicate the number of iterations allowed for triggering an iterative pre-emptive BSR for at least part of LCGs; or the BSR MAC CE includes a second iteration count indication used to indicate the number of iterations allowed for triggering an iterative pre-emptive BSR for at least one LCG.

In some embodiments, the BSR MAC CE includes a time budget indication used to indicate a time budget allowed for triggering an iterative pre-emptive BSR for at least one LCG.

An embodiment of this application further provides a readable storage medium, where the readable storage medium stores a program or instructions, and when the program or the instructions are executed by a processor, the processes of the embodiments of the foregoing method for configuring a pre-emptive BSR are implemented, with the same technical effects achieved. To avoid repetition, details are not described herein again.

The processor is the processor in the electronic device in the foregoing embodiments. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the processes of the embodiments of the foregoing method for configuring a pre-emptive BSR, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element. In addition, it should be noted that the scopes of the method and apparatus in the embodiments of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

Based on the foregoing description of the embodiments, persons skilled in the art can clearly understand that the method in the foregoing embodiments may be implemented by software with a necessary general hardware platform. Certainly, the method in the foregoing embodiments may alternatively be implemented by hardware. However, in many cases, the former is a preferred embodiment. Based on such an understanding, the technical solutions of this application essentially or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners shall fall within the protection scope of this application.

What is claimed is:

1. A method for configuring a pre-emptive buffer status report (BSR), comprising:
   receiving, by an integrated access backhaul (IAB) node, a pre-emptive BSR configuration parameter, wherein the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

2. The method for configuring a pre-emptive BSR according to claim 1, wherein the configuration parameter comprises at least one of the following:
   logical channel group (LCG) list for which triggering an iterative pre-emptive BSR is allowed;
   logical channel (LCH) list for which triggering an iterative pre-emptive BSR is allowed;
   data radio bearer (DRB) list for which triggering an iterative pre-emptive BSR is allowed;
   service type list for which triggering an iterative pre-emptive BSR is allowed;
   user equipment (UE) type for which triggering an iterative pre-emptive BSR is allowed;
   number of iterations allowed for triggering an iterative pre-emptive BSR; or,
   time budget allowed for triggering an iterative pre-emptive BSR.

3. The method for configuring a pre-emptive BSR according to claim 2, wherein the configuration parameter is carried in a BSR medium access control (MAC) control element (CE).

4. The method for configuring a pre-emptive BSR according to claim 3, wherein the BSR MAC CE comprises one or more logical channel identity (LCID) values, and the one or more LCID values each indicate the number of iterations allowed for triggering an iterative pre-emptive BSR;
   wherein the method further comprises: after the pre-emptive BSR is triggered, selecting one LCID value from the one or more LCID values to indicate the number of iterations allowed for triggering an iterative pre-emptive BSR.

5. The method for configuring a pre-emptive BSR according to claim 3, wherein the BSR MAC CE comprises a first bit map, and each bit in the first bit map corresponds to one LCG, indicating whether to trigger an iterative pre-emptive BSR based on a corresponding LCG; or,
   wherein the BSR MAC CE comprises a first iteration count indication used to indicate the number of iterations allowed for triggering an iterative pre-emptive BSR for at least part of LCGs; or the BSR MAC CE comprises a second iteration count indication used to indicate the number of iterations allowed for triggering an iterative pre-emptive BSR for at least one LCG.

6. The method for configuring a pre-emptive BSR according to claim 5, wherein the method further comprises:
if the IAB node generates, based on a first iterative pre-emptive BSR received, a second iterative pre-emptive BSR to be transmitted to the parent IAB node, decrementing a value of a first iteration count indication or a second iteration count indication in the first iterative pre-emptive BSR by 1, and adding the resulting value to the second iterative pre-emptive BSR.

7. The method for configuring a pre-emptive BSR according to claim 3, wherein the BSR MAC CE comprises a time budget indication used to indicate a time budget allowed for triggering an iterative pre-emptive BSR for at least one LCG;
wherein the method further comprises: if the IAB node generates, based on a first iterative pre-emptive BSR received, a second iterative pre-emptive BSR to be transmitted to the parent IAB node, subtracting a time budget required for an uplink transmission process scheduled for a current hop from a value of a time budget indication in the first iterative pre-emptive BSR to obtain a remaining time budget, and using the remaining time budget as a value of a time budget indication in the second iterative pre-emptive BSR.

8. The method for configuring a pre-emptive BSR according to claim 1, wherein the configuration parameter further comprises any one of the following:
first indication information used to indicate whether a subsequent intermediate node of the IAB node triggers an iterative pre-emptive BSR; or,
second indication information used to indicate that a subsequent intermediate node of the IAB node determines, based on a pre-emptive BSR received, whether to trigger an iterative pre-emptive BSR.

9. The method for configuring a pre-emptive BSR according to claim 8, wherein if an uplink from the intermediate node to the parent IAB node is congested, an iterative pre-emptive BSR is not triggered; or if an uplink from the intermediate node to the parent IAB node is not congested, an iterative pre-emptive BSR is triggered.

10. A method for configuring a pre-emptive buffer status report (BSR), comprising:
transmitting, by a centralized unit (CU), a pre-emptive BSR configuration parameter to an integrated access backhaul (IAB) node, wherein the configuration parameter is used to indicate whether the IAB node triggers an iterative pre-emptive BSR, and the iterative pre-emptive BSR is a pre-emptive BSR that is generated based on a received pre-emptive BSR by the IAB node and that is to be transmitted to a parent IAB node.

11. The method for configuring a pre-emptive BSR according to claim 10, wherein the configuration parameter comprises at least one of the following:
logical channel group (LCG) list for which triggering an iterative pre-emptive BSR is allowed;
logical channel (LCH) list for which triggering an iterative pre-emptive BSR is allowed;
data radio bearer (DRB) list for which triggering an iterative pre-emptive BSR is allowed;
service type list for which triggering an iterative pre-emptive BSR is allowed;
user equipment (UE) type for which triggering an iterative pre-emptive BSR is allowed;
number of iterations allowed for triggering an iterative pre-emptive BSR; or,
time budget allowed for triggering an iterative pre-emptive BSR.

12. The method for configuring a pre-emptive BSR according to claim 11, wherein the configuration parameter is carried in a BSR medium access control (MAC) control element (CE).

13. The method for configuring a pre-emptive BSR according to claim 12, wherein the BSR MAC CE comprises one or more logical channel identifier (LCID) values, and the one or more LCID values each indicate the number of iterations allowed for triggering an iterative pre-emptive BSR;
wherein the method further comprises: after the pre-emptive BSR is triggered, selecting one LCID value from the one or more LCID values to indicate the number of iterations allowed for triggering an iterative pre-emptive BSR.

14. The method for configuring a pre-emptive BSR according to claim 12, wherein the BSR MAC CE comprises a first bit map, and each bit in the first bit map corresponds to one LCG, indicating whether to trigger an iterative pre-emptive BSR based on a corresponding LCG; or,
wherein the BSR MAC CE comprises a first iteration count indication used to indicate the number of iterations allowed for triggering an iterative pre-emptive BSR for at least part of LCGs; or the BSR MAC CE comprises a second iteration count indication used to indicate the number of iterations allowed for triggering an iterative pre-emptive BSR for at least one LCG; or,
wherein the BSR MAC CE comprises a time budget indication used to indicate a time budget allowed for triggering an iterative pre-emptive BSR for at least one LCG.

15. The method for configuring a pre-emptive BSR according to claim 10, wherein the configuration parameter further comprises any one of the following:
first indication information used to indicate whether a subsequent intermediate node of the IAB node triggers an iterative pre-emptive BSR; or,
second indication information used to indicate that a subsequent intermediate node of the IAB node determines, based on a pre-emptive BSR received, whether to trigger an iterative pre-emptive BSR;
wherein if an uplink from the intermediate node to the parent IAB node is congested, an iterative pre-emptive BSR is not triggered; or if an uplink from the intermediate node to the parent IAB node is not congested, an iterative pre-emptive BSR is triggered.

16. An electronic device, comprising a processor, a memory, and a program or instructions stored in the memory and capable of running on the processor, wherein when the program or the instructions are executed by the processor, the steps of the method according to claim 10 are implemented.

17. An electronic device, comprising a processor, a memory, and a program or instructions stored in the memory and capable of running on the processor, wherein when the program or the instructions are executed by the processor, following steps are implemented:
receiving a pre-emptive buffer status report (BSR) configuration parameter, wherein the configuration parameter is used to indicate whether an integrated access backhaul (IAB) node triggers an iterative pre-emptive BSR, and the iterative pre-emptive BSR is a pre-emptive BSR that is generated based on a received pre-emptive BSR by the IAB node and that is to be transmitted to a parent IAB node.

18. The electronic device according to claim 17, wherein the configuration parameter comprises at least one of the following:
- logical channel group (LCG) list for which triggering an iterative pre-emptive BSR is allowed;
- logical channel (LCH) list for which triggering an iterative pre-emptive BSR is allowed;
- data radio bearer (DRB) list for which triggering an iterative pre-emptive BSR is allowed;
- service type list for which triggering an iterative pre-emptive BSR is allowed;
- user equipment (UE) type for which triggering an iterative pre-emptive BSR is allowed;
- number of iterations allowed for triggering an iterative pre-emptive BSR; or,
- time budget allowed for triggering an iterative pre-emptive BSR.

19. The electronic device according to claim 17, wherein the configuration parameter further comprises any one of the following:
- first indication information used to indicate whether a subsequent intermediate node of the IAB node triggers an iterative pre-emptive BSR; or,
- second indication information used to indicate that a subsequent intermediate node of the IAB node determines, based on a pre-emptive BSR received, whether to trigger an iterative pre-emptive BSR.

20. The electronic device according to claim 19, wherein if an uplink from the intermediate node to the parent IAB node is congested, an iterative pre-emptive BSR is not triggered; or if an uplink from the intermediate node to the parent IAB node is not congested, an iterative pre-emptive BSR is triggered.

* * * * *